INVENTOR
ALBERT F. PITYO

Nov. 25, 1969  A. F. PITYO  3,479,712
PARTS FABRICATING APPARATUS HAVING READILY REPLACEABLE
UNITS AND INDEXABLE WORK HOLDING RING STRUCTURE
Filed Jan. 10, 1967  4 Sheets-Sheet 2

INVENTOR
ALBERT F. PITYO

BY

*B. P. Fishman, Jr.*

ATTORNEY

Nov. 25, 1969

A. F. PITYO 3,479,712

PARTS FABRICATING APPARATUS HAVING READILY REPLACEABLE
UNITS AND INDEXABLE WORK HOLDING RING STRUCTURE

Filed Jan. 10, 1967

INVENTOR
ALBERT F. PITYO

BY
ATTORNEY

INVENTOR
ALBERT F. PITYO

BY B. P. Fishburn, Jr.
ATTORNEY

United States Patent Office 3,479,712
Patented Nov. 25, 1969

3,479,712
PARTS FABRICATING APPARATUS HAVING READILY REPLACEABLE UNITS AND INDEXABLE WORK HOLDING RING STRUCTURE
Albert F. Pityo, Cedar Grove, N.J., assignor to Federal Tool Engineering Company, Cedar Grove, N.J., a corporation of New Jersey
Filed Jan. 10, 1967, Ser. No. 608,296
Int. Cl. B23p 23/00
U.S. Cl. 29—38                                           7 Claims

ABSTRACT OF THE DISCLOSURE

A parts fabricating apparatus employing a basic or main drive having plural power take-off points for the direct operation of plural work processing apparatus modules or units; the individual apparatus units have built-in individual drives and are readily removable and replaceable on the fabricating apparatus. The apparatus possesses a work unit indexing ring structure having a highly accurate mover also driven from the main drive of the apparatus.

BACKGROUND OF THE INVENTION

The invention pertains to the class of apparatus which is employed for the manufacturing on a mass scale of small parts for the electrical and electronics industries, although other types of production are contemplated. Work of this character frequently involves the feeding, forming, cutting and welding of metal parts at several work stations of the fabricating apparatus and all of the operations must be done with extreme accuracy.

The prior art contains numerous teachings of apparatus for performing the individual work functions enumerated above and similar functions and these devices vary considerably in their constructions and drives. The prior art also contains teachings of machines for performing plural operations on work units at a number of different work stations, as where the work is indexed from station-to-station during the total fabricating of the parts. These prior art machines, while generally quite satisfactory in their operation, suffer from several deficiencies which result in poor economy of operation. Multiple work station fabricating machines usually embody several different work units, together with means for conveying or indexing the work from station-to-station or unit-to-unit. The drive mechanisms for the units generally are not self-contained and involve awkward components, such as cams, levers and links, which are connected wtih a power source or plural sources, usually below a main table. There is absolutely no standardization of the driving means for the individual work fabricating units and it is very awkward to remove individual units from the machine and when this is done, it involves dismantling of portions of the machine drive, resulting in idling of the entire machine while repairs or adjustments are being made. Additionally, when individual apparatus units constructed in the conventional manner are removed from the main machine, they usually cannot be benched-operated or bench-tested because portions of their drive mechanism remain attached to the main machine. This is a great disadvantage and renders it expensive and time-consuming to make necessary repairs and sometimes requires the entire fabricating machine to be shut down for indefinite periods. Where a certain production schedule must be kept, it will become necessary to have entire stand-by machines ready for operation at all times and these machines are very expensive.

SUMMARY OF THE INVENTION

In accordance with the invention, a parts fabricating machine is provided having a basic built-in drive powered from one main source. This main drive has multiple power take-offs, such as gear or chain take-offs, and these are preferably uniform throughout the main drive. Each power take-off is adapted to drive or power the input shaft of an individual module or work processing unit, the latter having built-in drive mechanism and therefore being completely self-contained and adapted for quick removal from the bed of the main apparatus. Additionally, these modules or units are quickly replaceable in the main apparatus by identical or similar modules and the removed modules can be readily operated on a test bench having means for powering the input shaft of the module undergoing repairs or testing. The main apparatus need never be shut down for any appreciable length of time and it may be operated with all of its modules mounted or with certain modules omitted entirely depending upon the nature of the work being processed. In such cases, a certain power take-off will simply idle during the operation of the apparatus and there will be no interference whatsoever with the normal operation of the active power take-offs and the modules which they drive. There will be no awkward mechanical connections to be established between the machine main drive and the individual apparatus modules and generally all that is required is the simple coupling of a pair of bevel gears or the like.

The invention also embodies a unique ring structure which supports multiple work holders and means for accurately indexing the ring and its holders from station-to-station during the fabrication of parts. The ring structure is mounted for movement in a highly accurate manner and the accurate indexing cam is driven directly from the apparatus main drive. The use of the ring structure renders it possible to establish work stations and modules both inside and outside of the ring at desired points around the circumference of the ring. This feature increases the number of modules which may be employed and the overall capabilities of the apparatus.

DESCRIPTION OF THE PREFERRED EMBODIMENTS

Figure 1:
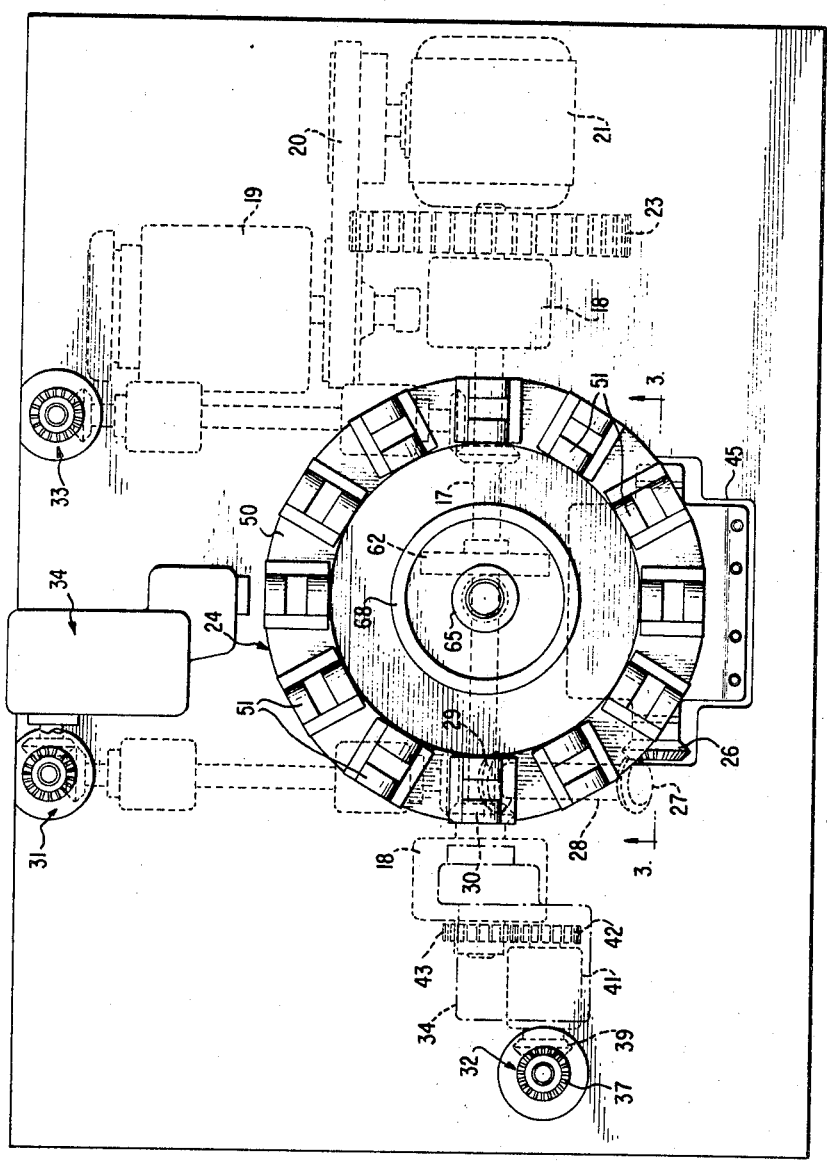
FIGURE 1 is a partly diagrammatic plan view of a fabricating apparatus embodying the invention.
Figure 6:
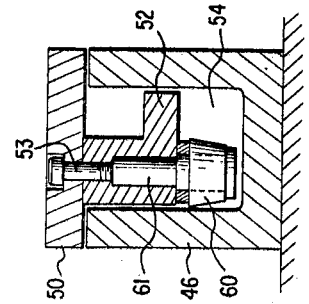
FIGURE 6 is a similar section taken on line 6—6 of FIGURE 3.

Referring to the drawings, wherein like numerals designate like parts, FIGURES 1 through 6 show a preferred embodiment of the invention. In these figures, the numeral 15 designates a primary support or table which is fixedly supported at the desired elevation by sturdy framing 16. Mounted on the bottom side of the table 15 and depending therefrom is the apparatus main drive including a main horizontal shaft 17 journaled in bearings 18 which are rigidly secured to the table 15. The shaft 17 is powered by a main drive motor 19, connected by transmission gearing 20 to a conventional speed reducer 21 whose output shaft carries a small spur gear 22, in mesh with a larger gear 23 on the apparatus drive shaft 17. The power path to the shaft 17 may vary considerably under the invention as many conventional devices are available for use as basic drives. In any event, however, the apparatus is characterized by a main drive shaft from which components or modules are directly driven as will be described.

Mounted centrally on the table 15 is a work holding and indexing ring structure 24 to be described in full detail hereinafter. The indexing mechanism has a horizontal input shaft 25, FIGURE 3, beneath the table 15 upon which is mounted a bevel gear 26, meshing with and driven by another bevel gear 27 on a shaft 28 which extends radially of the main shaft 17, at right angles thereto. The lower end of shaft 28 carries a bevel gear 29 meshing with and driven by another bevel gear 30 on the main shaft 17. In this manner, the indexing mechanism whose structure will be described is driven during the operation of the apparatus.

Figure 2:
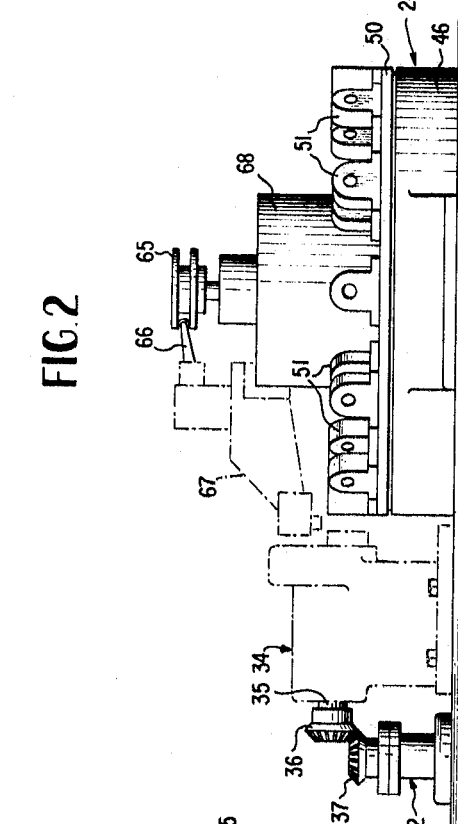
FIGURE 2 is a side elevation of the apparatus depicted in FIGURE 1.

As depicted in FIGURE 1, for example, similar individual power take-offs 31, 32 and 33 are provided for the powering of individual self-contained apparatus modules 34, one of which is clearly shown in FIGURE 2 connected with the adjacent power take-off 32. The apparatus modules 34 are mounted on top of the table 15 in a fixed position by bolting or the like and are readily removable from the main table for bench-testing, repair or adjustment. Individual modules 34 may serve totally different purposes in the overall parts fabricating machine of the invention. For example, a given module may be a feeder for an indefinite length of wire or metal ribbon. Another module somewhere else on the circumference of the indexing mechanism 24 may be a former. Another module at another work station may be a cutter and still another may be a welder. Certain modules of the apparatus may perform two or more functions necessary to the complete fabrication of parts. The various functions of these modules are well known in the art and are not novel per se and therefore it is unnecessary in the present application to illustrate or describe details of the individual machine modules or units, other than to describe their connections with the main drive beneath the table 15.

In this connection, referring to the power take-off 32 and the apparatus module 34 adjacent thereto, the module 34 has an input shaft 35 from which all of the internal mechanism of the self-contained module is driven. Such mechanism may include cams, gears, levers and the like depending upon the nature of the module 34 and the work it must perform, for example, as a welder, former, cutter, assembler or the like. The input shaft 35 carries a bevel gear 36 meshing with a bevel gear 37 of the power take-off 32. As shown, the gears 36 and 37 are well above the table 15 so that the connection may be made above the table and independently of the main drive below the table. The power take-off 32 includes another bevel gear 38 substantially below the table 15, in mesh with a bevel gear 39 on a short shaft 40 journaled in a fixed bearing 41 which depends rigidly from the table 15. The shaft 40 carries a spur gear 42, in mesh with another gear 43 on the main shaft 17, see FIGURE 1. In this manner, the main shaft 17 powers the modbule or unit 34 above the table and none of the operating parts of the module extend below the table or need be connected up with the lower main drive. The arrangement makes it a very simple matter to unbolt the module or unit 34 and remove it bodily from the main machine, in which case the gear 36 is removed from the machine while the gear 37 remains in place, always in proper location to drive a substitute or replacement module. The removed module 34 may simply be shifted to a bench for testing or repair and the bench may be equipped with a drive gear similar to the gear 37.

In a very similar manner, additional apparatus units or modules 34 may be mounted on the table 15 and connected with the power take-offs 31 and 33 in the same manner shown and described in connection with the take-off 32. The fabricating apparatus may have any practical number and spacing of power take-offs, all driven from the main shaft 17, and the invention is not limited to the particular number and spacing of power take-offs shown in the present drawing. In some cases, as will be further described, one or more power take-offs may be located inside of the indexing ring structure 24 instead of or in addition to the power take-offs located externally of the ring structure.

Referring back to the indexing ring structure 24 and the drive shaft 25 and drive gear 26 thereof, referring particularly to FIGURES 3 through 6, an indexing or cross-over cam 44 is mounted on the shaft 25 to turn therewith. The cam 44 is enclosed by a housing 45 which may constitute an extension of the stationary ring housing 46 of the indexing ring structure, or a separate section bolted thereto, if preferred. The housing 45 contains suitable bearings 47 for the drive shaft 25. The rotary cam 44 is provided with lands 48 defining an index displacement groove 49 between them, and the purpose of the cam is to accurately index a work supporting ring 50 which is positioned above the stationary ring housing 46 and movably mounted thereon, the ring housing 46 being U-shaped in cross section, FIGURES 5 and 6. A plurality of circumferentially spaced work holders 51 of any preferred type are fixedly mounted upon the indexable ring 50 for turning movement therewith relative to the plural work stations of the apparatus whose positions are defined by the power take-offs 31, 32 and 33.

Figure 5:
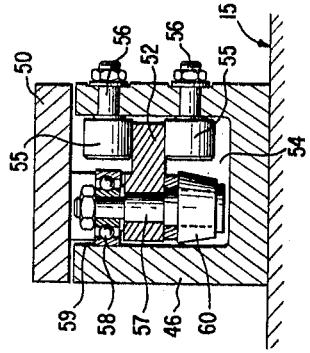
FIGURE 5 is a fragmentary vertical section through the indexing ring structure taken on line 5—5 of FIGURE 3.
Figure 3:
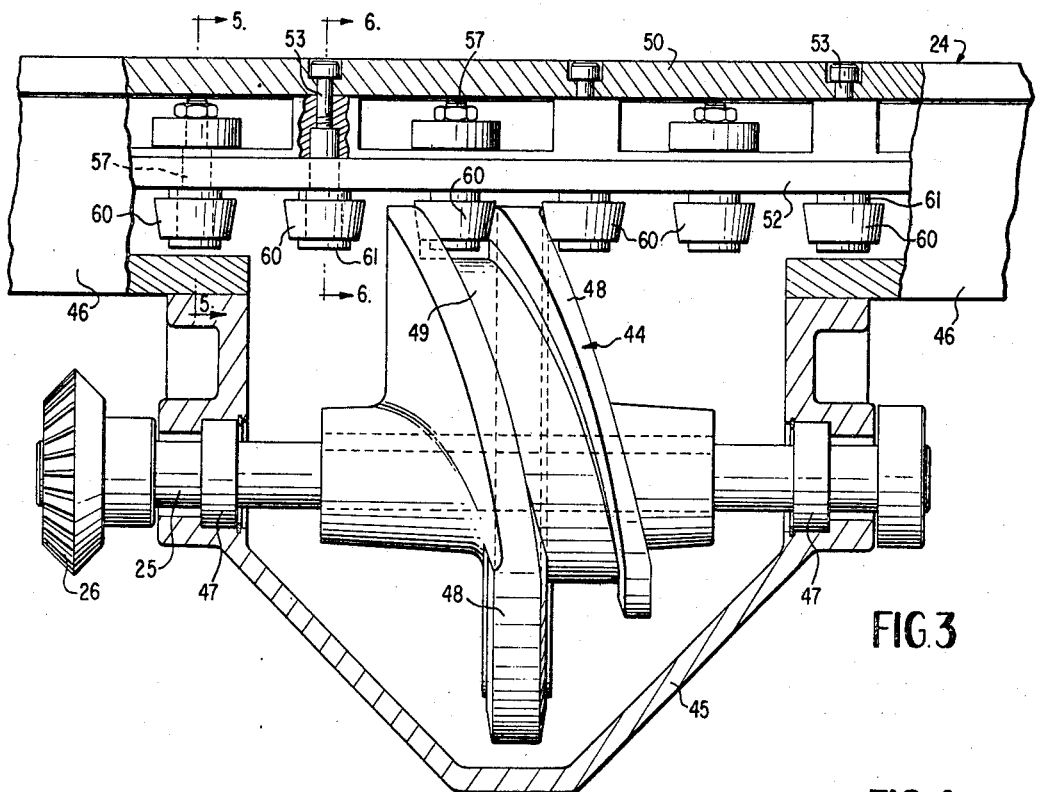
FIGURE 3 is an enlarged fragmentary vertical section through an indexing cam and associated elements taken on line 3—3 of FIGURE 1, with parts omitted for simplification.
Figure 4:
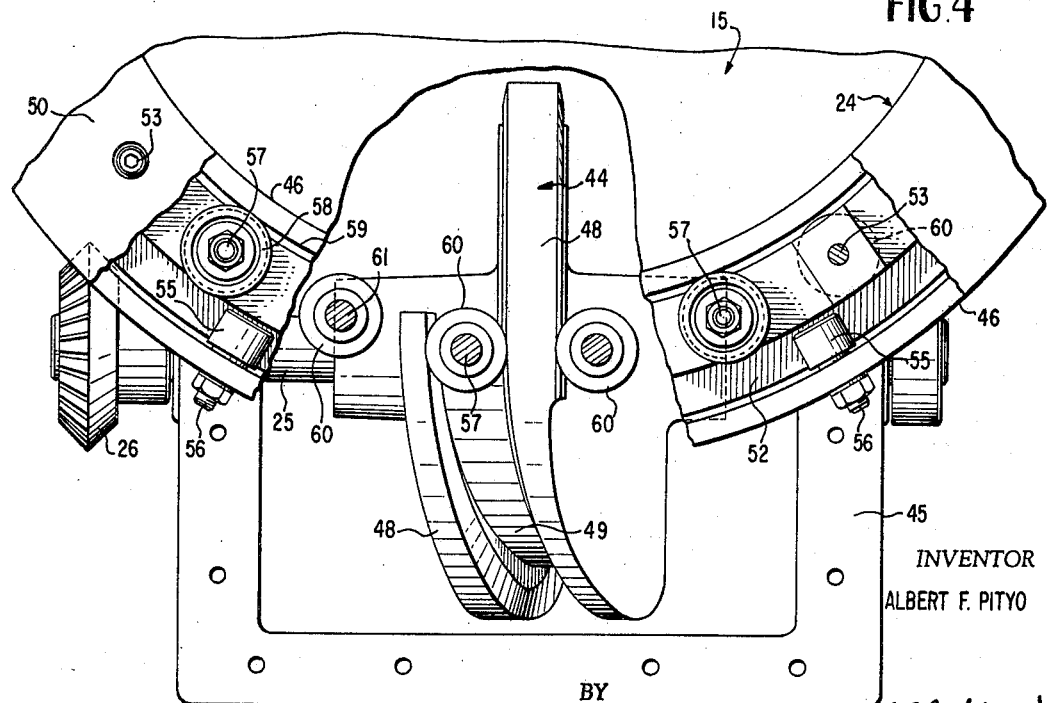
FIGURE 4 is an enlarged fragmentary plan view of the elements in FIGURE 3, partly in section and partly broken away.

The ring 50 is very accurately supported relative to the fixed ring housing 46 and the indexing cam 44. An annular guide rail 52 is suspended from the ring 50 by a number of circumferentially spaced screws 53, and the guide rail is positioned centrally within the annular cavity 54 of ring housing 46, as shown. In order to support and stabilize the rail 52 and to render it free-turning in a horizontal plane, pairs of low friction rollers 55 engage the upper and lower machined faces of the rail, as shown in FIGURES 4 and 5. Pairs of the rollers 55 are located at circumferentially equidistantly spaced points around the ring housing 46 and the rollers 55 are anchored to one side wall of the ring housing as indicated at 56.

Intermediate the suspension screws 53, additional circumferentially equidistantly spaced shafts 57 extend through vertical openings in the rail 52 and are suspended from a corresponding number of ball bearings 58 above the rail 52, whose outer races engage a side machined face 59 of the ring housing 46. Thus, the ball bearings 58 consitute rollers for stabilizing the annular rail 52 in a plane at right angles to the axes of the rollers 55. The lower ends of the several shafts 57 carry tapered rollers 60 adapted to engage the indexing cam 44 in the manner shown in FIGURES 3 and 4. The shafts 57 and rollers 60 lie bodily within the annular cavity 45 and the rollers 60 are below the rail 52, as shown.

Additional identical cam-engaging rollers 60 are supported on the lower ends of shafts 61 which have screw-threaded engagement with the suspension screws 53. All of the cam-engaging rollers 60 are equidistantly spaced circumferentially and arranged at the proper elevation for successive engagement with the indexing cam 44 as the latter rotates. The cam is designed to cause a very accurate indexing of the ring 50 with the work holders 51 from work station-to-work station of the fabricating apparatus so that different processing steps may be performed by the modules 34 at the several stations. The precise design of the cam 44 may be varied to meet the needs of various embodiments of the apparatus involving different spacings and different numbers of power take-offs and replaceable apparatus modules.

A further and optional feature of the apparatus embodiment shown in FIGURES 1 through 6 comprises a cam element 62 on the main drive shaft 17 engaging a small follower 63 on a vertical reciprocating shaft 64 having a grooved collar 65 on its upper end operatively connected at 66 with an additional fabricating device 67 which may operate on the work units in the holders 51 independently of the modules 34 or in concert therewith. The device 67 may be a welder, former or the like. It may be suitably mounted on a central pedestal 68 of the main apparatus. Like the other machine modules, power for the device 67 is derived from the main shaft 17.

Figure 7:
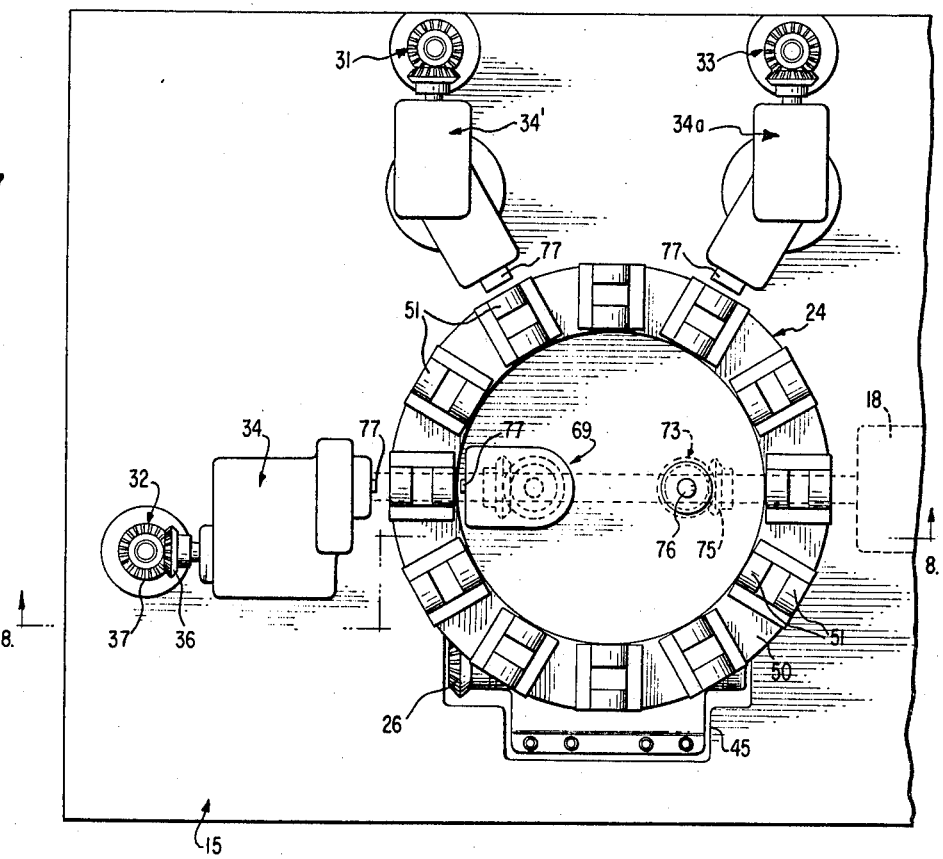
FIGURE 7 is a fragmentary plan view showing a modification of the invention.
Figure 8:
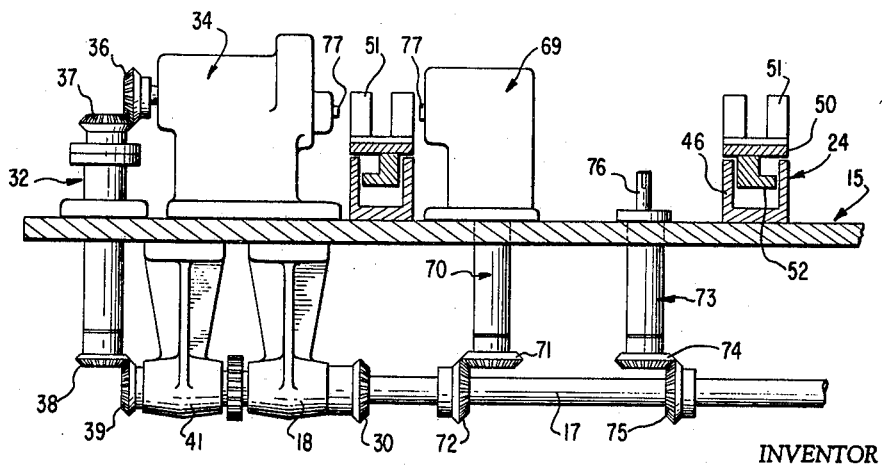
FIGURE 8 is a vertical section taken on line 8—8 of FIGURE 7.

FIGURES 7 and 8 of the drawings show a modification of the invention where work units or modules are arranged both inside and outside of the indexing ring structure 24. The structure 24 and its cam drive may be identical to the corresponding elements in the previous embodiment and need not again be described.

In FIGURES 7 and 8, the table 15 is indicated, together with the previously-described main drive shaft 17, driven from the same power source illustrated in FIGURES 1 and 2. FIGURE 7 shows the previously-described module 34 with its input gear 36 in mesh with the gear 37 of power take-off 32. Additional replaceable modules 34' and 34a are shown with their input gears connected to the previously-described power take-offs 31 and 33. The modules or units 34, 34' and 34a and the associated power take-offs are located outwardly of the ring structure 24, as shown.

Additionally, instead of the device 67 and cam 62 of the prior embodiment, another fabricating module 69 of any preferred type is mounted on the table 15 within the confines of the ring structure 24 and is powered by a vertical bevel gear power take-off 70 similar to the take-off 32 and having a lower bevel gear 71 meshing with a companion gear 72 on the main shaft 17. In the manner previously described, the module or unit 69 is removable or replaceable without in any way interfering with the continued operation of the other components of the apparatus and the unit 69 is self-contained and requires no direct connection with the basic drive beneath the table except through the take-off 70.

FIGURES 7 and 8 also depict an additional power take-off 73 including gears 74 and 75 driven from the main shaft 17. The take-off 73 has an upright shaft extension 76 located inside of the ring structure 24 and capable of operating another apparatus module when this is desirable. In the present illustration, the shaft 76 is not being used and merely idles during the operation of the apparatus. Additional power take-offs and modules could be employed inside and outside of the indexable ring structure 24 and different spaced relationships between the power take-offs could be provided, FIGURES 7 and 8, within the scope of the invention. In all cases, the working terminals 77 of the several fabricating modules are disposed close to the indexable work holders 51 so as to be capable of performing operations on the work units, not shown, therein.

To avoid duplication, some of the gearing between the main shaft 17 and the external power take-offs 31 and 33 has been omitted in FIGURES 7 and 8 and also some of the gearing between the shaft 17 and the indexing cam 44. The previously-described gear 30 is shown in FIGURE 8.

In both forms of the invention, the main drive shaft 17 is turned by the motor 19 and associated gearing and the indexing cam drive shaft 25 is continuously driven through the gears 27 and 26. The action of the cam 44 with the spaced rollers 60 causes the ring 50 and its work holders 51 to be indexed a step at a time equal to the distance between adjacent work holders. Variations in the cam and the number and spacing of work holders is contemplated. At each dwell of the indexable ring 50, the fabricating modules 34, etc. will perform the required operations on the work units within the holders 51 and in this manner, as the indexing continues from work station-to-work station, the completed parts will be produced. One of the modules of the machine may be an ejecting device for the work units and one of the modules may be a feeding or introducing device which initially places the work units in the holders 51. The various capabilities of the apparatus in this respect will be readily known by those skilled in the art of fabricating and assembling parts.

One very valuable characteristic and advantage of the invention not previously emphasized is the fact that a substantially standard driving connection between the main drive mechanism beneath the table and the individual interchangeable apparatus modules may be provided. That is to say, the bevel gears or chains and sprockets or whatever type of driving connection existing between the individual power take-offs and the individual modules may be standardized in the apparatus so that the interchanging of modules or units is facilitated to the maximum possible extent.

It is thought that the advantages of the modular-type apparatus with quickly interchangeable units and the unique indexing ring structure which can accommodate modules both externally and interiorly will now be clear to those skilled in the art, without the necessity for any further description herein.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. Apparatus for fabricating parts comprising in combination a stationary supporting structure, a substantially horizontal indexable work holding ring rotatably mounted on the support structure, a plurality of circumferentially spaced work holders mounted on said ring, the support structure including a table portion extending radially inwardly and outwardly of the ring, interchangeable self-contained parts fabricating units removably mounted on the upper surface of the table portion at selected positions radially inwardly and outwardly of the indexable work holding ring, a rotary input member connected to each fabricating unit, a main power drive on the support structure including a main rotary shaft disposed beneath the table portion, indexing cam means mounted on the support structure beneath the table portion, said indexing cam means being operatively connected to said work holding ring, a rotary input part connected to said cam means, a rotary stub shaft disposed beneath said table portion, one end of said stub shaft being coupled with and driven by the main rotary shaft, the opposite end of said stub shaft being coupled with and driving the input part of the cam means, a plurality of rotary power take-off shafts extending upwardly through the table portion, one end of each power take-off shaft being coupled with and driven by said main shaft, the opposite end of each power take-off shaft being adapted to be coupled to the rotary input member of a respective fabricating unit.

2. The apparatus of claim 1, wherein said indexing cam includes lands forming an index displacement groove, and circumferentially spaced follower rollers on said work holding ring engageable sequentially with the lands and within said groove to cause indexing of the ring when the cam rotates.

3. The apparatus of claim 2, and an annular stationary guide track means for said work holding ring on said table portion to guide the ring accurately as the same is indexed.

4. The apparatus of claim 3, and a guide rail portion secured to and moving with the work holding ring adjacent the guide track means, stabilizing rollers on the guide track means engaging said guide rail portion to prevent vertical displacement thereof, and additional roller means on the work holding ring engaging the guide track means and stabilizing the work holding ring radially.

5. The apparatus of claim 4, wherein the guide track means comprises a generally U-shaped guide track including an annular side wall and said additional roller means consisting of circumferentially spaced plural low friction rollers engaging said annular side wall.

6. The apparatus of claim 4, and said stabilizing rollers arranged in circumferentially spaced pairs on said guide track means and engaging top and bottom faces of said guide rail portion.

7. The apparatus of claim 1, wherein said rotary power take-off shafts and said main rotary shaft are coupled by bevel gears and the tops of said plural rotary power take-off shafts are coupled with the input elements of the fabricating units by bevel gears.

References Cited

UNITED STATES PATENTS

| | | | |
|---|---|---|---|
| 1,627,934 | 5/1927 | Stein | 29—33.8 |
| 2,454,269 | 11/1948 | Branchler | 29—38.2 |
| 2,120,877 | 6/1938 | Uber | 29—33.8 |
| 1,975,007 | 9/1934 | Kingsbury | 29—38.3 |
| 1,975,006 | 9/1934 | Kingsbury | 29—38.3 |
| 1,833,329 | 11/1931 | Packer | 29—33.8 |

FRANCIS S. HUSAR, Primary Examiner